(12) United States Patent
Heimann et al.

(10) Patent No.: US 7,287,814 B2
(45) Date of Patent: Oct. 30, 2007

(54) FITTING FOR A VEHICLE SEAT (75) Inventors: Bernd Heimann, Meisenheim (DE);
Martin Gehrhardt, Olsbrücken (DE);
Martin Lübken, Kaiserslautern (DE);
Stefan Haber, Pirmasens (DE)

(73) Assignee: KEIPER GmbH & Co. KG,
Kaiserslautern (DE)

( * ) Notice: Subject to any disclaimer, the term of this patent is extended or adjusted under 35 U.S.C. 154(b) by 0 days.

(21) Appl. No.: 11/213,558

(22) Filed: Aug. 26, 2005

(65) Prior Publication Data
US 2006/0055219 A1    Mar. 16, 2006

(30) Foreign Application Priority Data
Aug. 27, 2004   (DE) ................. 10 2004 041 449

(51) Int. Cl.
*B60N 2/02* (2006.01)
(52) U.S. Cl. ............ 297/367; 297/378.12; 297/378.11; 297/216.13
(58) Field of Classification Search ................. 297/367, 297/216.13, 378.12, 378.11
See application file for complete search history.

(56) References Cited
U.S. PATENT DOCUMENTS

| | | | |
|---|---|---|---|
| 6,540,232 B2 | 4/2003 | Hänsel et al. | |
| 6,540,297 B2 * | 4/2003 | Hansel | 297/367 |
| 6,598,938 B2 | 7/2003 | Boltze et al. | |
| 6,722,739 B2 | 4/2004 | Klein et al. | |
| 6,742,845 B2 | 6/2004 | Nock | |
| 6,840,579 B2 | 1/2005 | Klein et al. | |
| 6,860,560 B2 * | 3/2005 | Chiu et al. | 297/367 |
| 6,893,093 B2 * | 5/2005 | Nock et al. | 297/367 |
| 7,000,992 B2 * | 2/2006 | Armbrust et al. | 297/378.11 |
| 7,086,697 B2 * | 8/2006 | Tame | 297/367 |
| 2002/0170381 A1 | 11/2002 | Hansel et al. | |
| 2004/0130199 A1 | 7/2004 | Armbrust et al. | |
| 2004/0245816 A1 | 12/2004 | Nock et al. | |

FOREIGN PATENT DOCUMENTS
DE    102 35 141 A1    2/2004

* cited by examiner

*Primary Examiner*—David Dunn
*Assistant Examiner*—Erika Garrett
(74) *Attorney, Agent, or Firm*—Womble Carlyle Sandridge & Rice, PLLC (57) ABSTRACT

A fitting includes a movable locking device connected to a lower fitting part for engaging an upper fitting part and thereby locking the fitting, a control cam for engaging with a control element of the upper fitting part and thereby controlling the engagement of the locking device and the upper fitting part, and a spring-loaded clamping eccentric that acts on the locking device for securing its engagement with the upper fitting part. For unlocking the fitting, the spring-loaded clamping eccentric is moved with an actuating force in a first unlocking step, so that the engagement of the locking device and the upper fitting part is removed. In the first unlocking stage, the control cam and the control element still engage. In a second unlocking stage, which is attainable with a higher actuating force, the engagement of control cam and control element is at least to a large extent is removed.

20 Claims, 4 Drawing Sheets

FITTING FOR A VEHICLE SEAT

BACKGROUND OF THE INVENTION

The present invention relates to a fitting for a vehicle seat, in particular for a motor vehicle seat, with a lower fitting part, an upper fitting part, which is pivotable relative to the lower fitting part around a bearing bolt, a movable locking device, which is connected to the lower fitting part and is for engaging with the upper fitting part for locking of the fitting, a control cam, which is attached to the locking device for engaging with at least one control element of the upper fitting part for controlling the cooperation between the locking device and the upper fitting part, and at least one movably mounted, spring-loaded clamping eccentric, which at least indirectly acts on the locking device and which secures the engagement between the locking device and the upper fitting part under normal conditions, whereby for the unlocking of the fitting the spring-loaded clamping eccentric is moved so that the engagement of the locking device and the upper fitting is terminated.

DE 102 35 141 A1 and corresponding U.S. 2004/0245816 A1 disclose a fitting of the above-described type that is designed for the backrest of a vehicle seat. The locking device engages with a gear rim of the upper fitting part. The control cam connected with the locking device engages with different control elements on the upper fitting part, so that the fitting is lockable only in certain positions of the backrest. For unlocking, the same actuating force is required in each case, in order to move the first locking element away from the locking device so that it no longer engages with the upper fitting part.

BRIEF SUMMARY OF SOME ASPECTS OF THE INVENTION

In accordance with one aspect of the present invention, a fitting for a vehicle seat, in particular for a motor vehicle seat, has a lower fitting part, an upper fitting part that is pivotable relative to the lower fitting part around a bearing bolt, a movable locking device that is connected to the lower fitting part for engaging with the upper fitting part and thereby locking the fitting, a control cam attached to the locking device for engaging with at least one control element of the upper fitting part and thereby at least partially controlling the cooperation between the locking device and the upper fitting part, and at least one movably mounted, spring-loaded clamping eccentric. In a first configuration of the fitting, the spring-loaded clamping eccentric at least indirectly acts on the locking device to at least partially secure the engaging of the locking device with the upper fitting part at least under normal conditions. A first actuating force is required for moving the spring-loaded clamping eccentric so that the fitting can be transitioned from the first configuration to a second configuration (e.g., a first unlocking stage). In the second configuration, the locking device is disengaged from the upper fitting part, and the spring-loaded clamping eccentric is engaged to the at least one control element. A second actuating force is required for moving the spring-loaded clamping eccentric so that the fitting can be transitioned from the second configuration to a third configuration (e.g., a second unlocking stage). In the third configuration, the locking device is disengaged from the upper fitting part, and the spring-loaded clamping eccentric is at least substantially disengaged from the control element.

Because the control cam and the control element are engaged to one another in the first unlocking stage, whereas the engagement of control cam and control element is, at least to a large extent, nonexistent in the second unlocking stage, which is attainable with a higher actuating force, more frequently necessary transitions can be made more easily, i.e. with a smaller actuating force, while less frequently needed transitions are protected against unintended initiation by a higher actuation force. The transitions are, in the use of a vehicle seat, allowed rotational motions of components, for example the backrest, over certain angle ranges. In this example the backrest can make a free rotation with a smaller actuation force, while a transition to a table position, a base position, or something similar, can take place only when intended and with a higher actuating force. The engagement of the control cam and the control element does not need to be completely nonexistent during the second unlocking stage. That is, when necessary a small frictional engagement can be present between the control cam and the control element during the second unlocking stage; however, this frictional engagement is very small compared to the higher actuating force.

The control element preferably has, radially relative to the bearing bolt, at least two different steps for interacting with the control cam, so that the control cam can be supported in at least two different positions. These two steps preferably extend, with respect to the bearing bolt, in a circumferential direction with over successive angle ranges, so that the positions of the control cam correspond to different angles between the fittings parts. The two steps are preferably separated by a shoulder in the circumferential direction, in order to enable a simple transition and to limit one of the steps in the circumferential direction. The shoulder thus has an impact function, preferably for the free rotation process of the backrest.

With this arrangement of steps of the control element preferably each unlocking stage is provided with one of the steps. The locking device, which preferably engages by a toothed engagement with the fitting upper part, is thereby brought into both unlocking stages without intervention. In the first unlocking stage, the control cam, which is preferably fixedly connected to the locking device for pivoting therewith, engages, for example in the circumferential direction, positively with the shoulder of the control element. Also in the first unlocking stage, the control cam frictionally engages, in a tangential or in a circumferential direction, a running contact surface of the control element (i.e., a running contact surface of the respective step of the control element). Only in the second unlocking stage can the control cam be led, unhindered or almost unhindered, past the control element.

The position of the control cam and, if applicable, the force exerted by it, is preferably controlled by the position of the first locking element (e.g., the spring-loaded clamping eccentric) relative to the locking device (e.g., detent pawl), whereby in the design in which the control cam is connected to the locking device for pivoting therewith, the first locking element preferably directly acts on the control cam.

Preferably, a control device is equipped with at least two springs, whose preloading and interconnection define the different actuating forces for the two unlocking steps. For example, two springs are supplied with different available preloading, whereby the actuating force in the first unlocking step overcomes the preloading of a spring and the actuating force in the second unlocking step overcomes the parallel connection of both preloaded springs. However, the springs can also be preloaded and interconnected differently.

The preloading of the springs is preferably delivered by virtue of the control device containing a base and at least two movable levers, namely a control lever and a clamping lever. The control lever is preloaded/biased with respect to the base by one of the springs, for example by means of the spring with the smaller preloading. The clamping lever is preloaded/biased with respect to the base by means of the other spring, for example by means of the spring with the larger preloading. The term "lever" is to encompass mainly pivotable mechanical parts, but does not exclude linearly movable parts. Preferably, one of the levers for the unlocking of the fitting is carried along after a delay, i.e. the clamping lever is carried along, after a period of not being carried along, whereby in the first unlocking stage only the control lever is moved.

For the case of a crash, preferably a second locking element (e.g., an intercepting component) is included, which supports the locking device in the case of a crash and which thereby prevents the unlocking of the fitting. The second locking element is arranged in the normal case in the opening direction of the locking device and at a small distance from it.

For the unlocking of the fitting the second locking element is first removed, whereby the first locking element preferably is carried along with delay with the second locking element, so that with only one operation the correct temporal sequence is achieved. The unlocking of the fitting is effectuated for example by moving a release bolt, which moves the second locking element and preferably the control lever, for example because it is firmly inserted into both components. Preferably, the release bolt is also a constituent of the couplings of the control lever with the clamping lever and the second locking element with the first locking element, for example as a shared component of slot and pin guides.

Other aspects and advantages of the present invention will become apparent from the following.

BRIEF DESCRIPTION OF THE DRAWINGS

The invention is explained in greater detail below with reference to an exemplary embodiment which is illustrated in the drawings, in which.

DETAILED DESCRIPTION OF EXEMPLARY EMBODIMENT

Figures 1, 2:
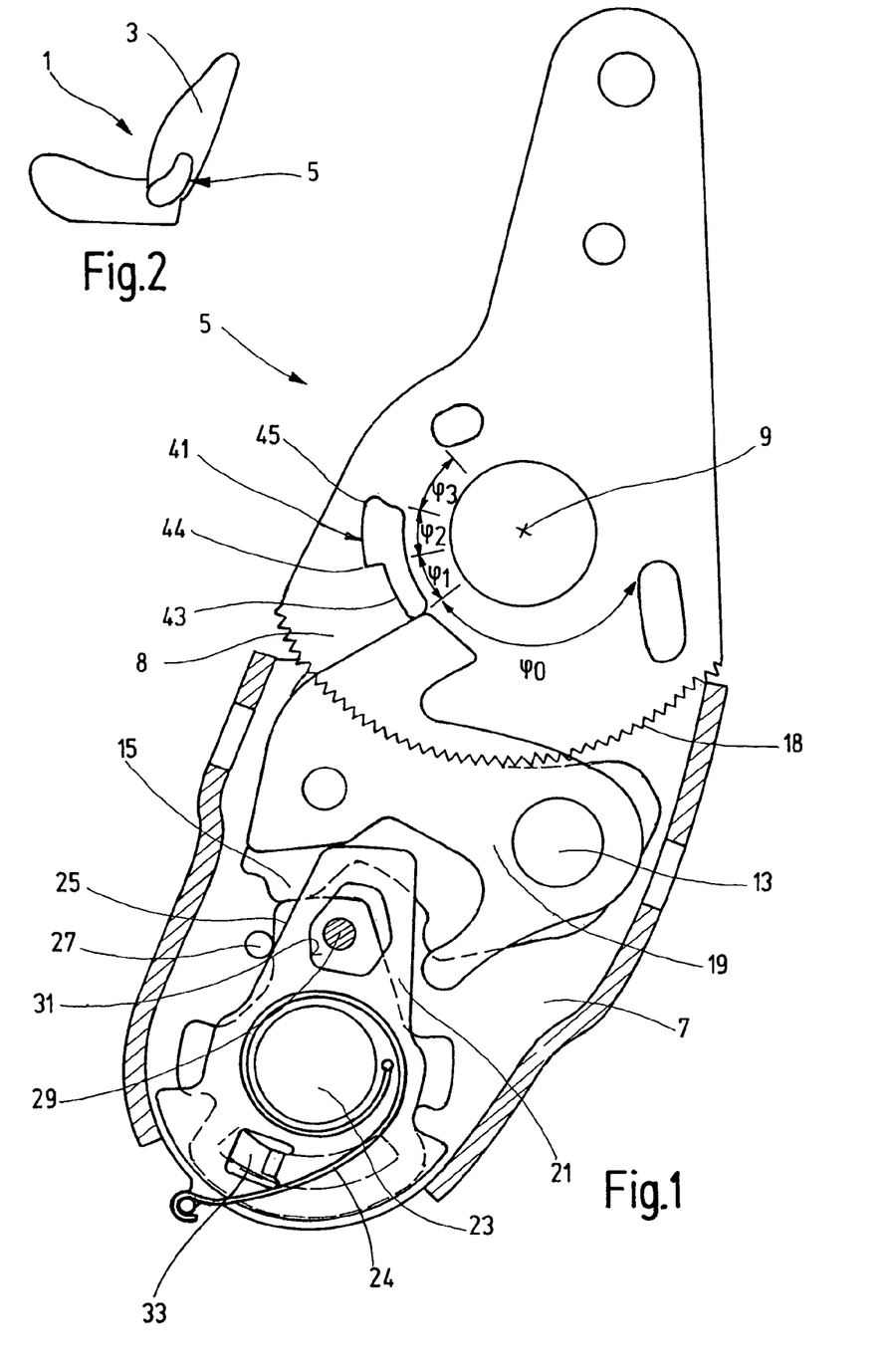
FIG. 1 is a partial view of the fitting in a custom position.
FIG. 2 is a schematic representation of a vehicle seat.

A vehicle seat 1 of a motor vehicle is, for the inclination adjustment of its backrest 3, equipped on both sides with a fitting 5. The basic operation of the fitting 5 is described in DE 102 35 141 A1 and corresponding U.S. 2004/0245816 A1, and the disclosures of both of DE 102 35 141 A1 and U.S. 2004/0245816 A1 are incorporated herein by reference in their entirety. The fitting 5 has a lower fitting part 7, which is fixed to the structure of the seat part of the vehicle seat 1, and an upper fitting part 8, which is fixed to a backrest structure 3 of the vehicle seat 1. The upper fitting part 8 is mounted on a bearing bolt 9 for pivoting relative to the lower fitting part 7. The bearing bolt 9 forms the backrest pivoting bolt and defines the cylindrical coordinates used in the Detailed Description section of this disclosure. The lower fitting part 7 consists of two plate-shaped, parallel casing parts, which are at such a distance from each other that a space is defined therebetween for accommodating the bolting and locking elements.

On a pawl bearing bolt 13 of the lower fitting part 7, parallel to the bearing bolt 9, a detent pawl 15, which functions as a locking device, is pivotably mounted. For locking, a toothing of the detent pawl 15 engages a counter locking element that is in the form of a gear rim that is formed on the upper fitting part 8. Likewise, a control cam 19 is mounted on the pawl bearing bolt 13. The control cam 19 is fixed to the detent pawl 15 for pivoting therewith. The control cam 19, in collaboration with control elements of the upper fitting part 8, controls the engagement of the detent pawl 15 with the gear rim 18, as will be discussed in greater detail below.

In order to secure the locked state of the fitting 5, different locking elements are provided. As the first locking element, a spring-loaded clamping eccentric 21 is pivotably mounted on an eccentric bearing bolt 23 that is parallel to the bearing bolt 9. The clamping eccentric 21 is loaded/biased, in the closing direction, by a spiral spring 24. The spring-loaded clamping eccentric 21 includes a clamping surface that is curved with respect to the eccentric bearing bolt 23. The curved clamping surface of the spring-loaded clamping eccentric 21 engages the control cam 19, which presses the detent pawl 15 into the gear rim 18. At the level of (i.e., in the same plane as) the detent pawl 15, an intercepting component 25 is pivotably mounted on the eccentric bearing bolt 23 as a second locking element. The intercepting component 25 is spring-loaded so that it is pressed against an exposed stop bolt 27 of the lower fitting part 7. In the locked state of the fitting 5, the intercepting component 25 is in the normal case positioned a small distance from the side of the detent pawl 15 that faces away from the toothed rim 18. This small distance is less than the height of the toothing of the detent pawl 15 and the gear rim 18. In the case of a crash, the intercepting component 25 supports the detent pawl 15 while it is loaded with an opening torque, so that the detent pawl 15 cannot open.

For the unlocking of the fitting 5, which is described in greater detail below, the intercepting component 25 is provided with a release bolt 29. The release bolt 29 is parallel to the bearing bolt 9 and is fixed to, and protrudes from, the intercepting component 25. The release bolt 29 extends from one side of the intercepting component 25 into an aperture 31 of the spring-loaded clamping eccentric 21 so that the release bolt 29 can engage an edge of the aperture 31. The release bolt 29 extends through the aperture 31 and also through a slot of the lower fitting part 7, so that the release bolt 29 extends out of the space defined between the two plate-shaped, parallel casing parts of the lower fitting part 7. In addition to the above-described coupling provided via the release bolt 29 and the aperture 31, the spring-loaded clamping eccentric 21 and the intercepting component 25 are coupled to each other through an (additional) slot and pin guide 33. When completely unlocking by moving the release bolt 29, the intercepting component 25 is first turned away from the detent pawl 15. The moving release bolt 29 eventually reaches the edge of the aperture 31, so that the spring-loaded clamping eccentric 21 is carried along after a delay by the release bolt 29, so that the clamping eccentric 21 releases the control cam 19 and thereby the detent pawl 15.

For controlling the locking of the fitting 5 in different positions of the backrest 3, different control elements protrude from the upper fitting part 8. These control elements that protrude from the upper fitting part 8 more specifically protrude axially into the plane in which the control cam 19 pivots, and are designed to engage the control cam 19. One of these control elements, which is identified by reference numeral 41 in FIGS. 1, 4 and 5, defines in the circumferential direction an end of the angle range $\phi_0$. The angle range $\phi_0$ is for providing custom positions, i.e. the more or less upright positions of the backrest 3, in which the detent pawl 15 can clamp unhindered onto the gear rim 18, since none of the control elements limit the movement of the control cam 19 in the angle range $\phi_0$.

Figure 4:
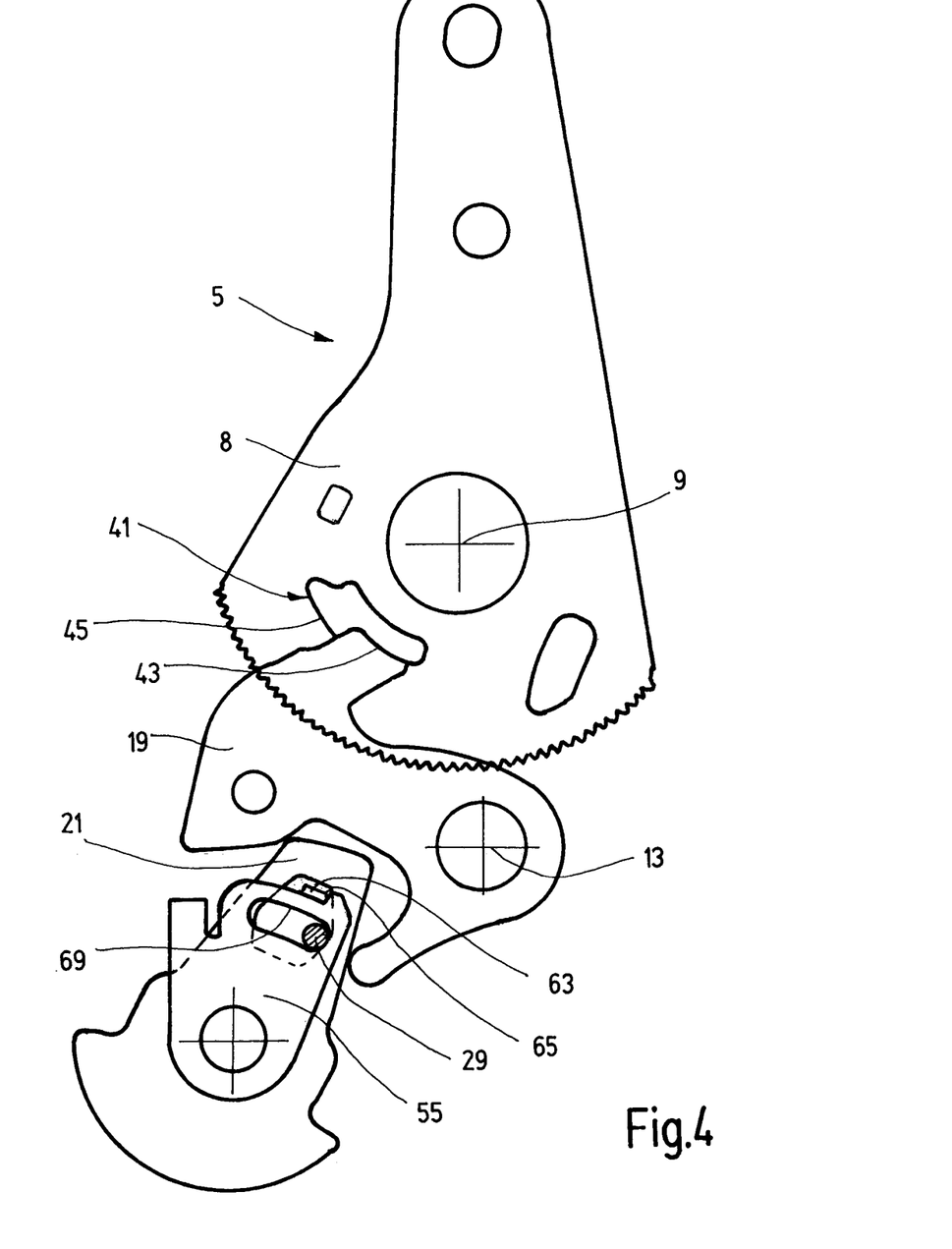
FIG. 4 is a simplified view similar to FIG. 1 but with the fitting in the first unlocking stage.

The control element 41 has two steps 43, 45 in the radial direction. The first step 43, which is adjacent the aforementioned angle range $\phi_0$ of the custom positions and extends for an angle range $\phi_1$, has a contact surface. The contact surface of the first step 43 has a constant radius with respect to the bearing bolt 9. This radius is dimensioned in such a way that the control cam 19 can abut the contact surface of the first step 43 in a manner so that the control cam 19 is held in engagement with the contact surface of the first step 43 by friction, due to urging by the spring-loaded clamping eccentric 21 (e.g., as shown in FIG. 4). The toothing of the detent pawl 15 cannot mesh the gear rim 18 while the control cam 19 is abutted to the contact surface of the first step 43.

Preferably, the control cam 19 rests against a radially extending shoulder 44, with the shoulder 44 forming the transition, in the circumferential direction, between the first and second step 43, 45. This special position, in which the control cam 19 rests against the radially extending shoulder 44, is a free rotating position, into which the backrest 3 is brought, in order to enable the access to seats which are provided behind the vehicle seat 1 in the driving direction. With the control cam 19 in this special position, in which the control cam 19 rests against the radially extending shoulder 44, the backrest 3 can be manually tilted back without separate unlocking; and after the backrest 3 is tilted back it automatically locks in the forward-most custom position.

The second step 45, which is adjacent to the first step 43 and extends over an angle range $\phi_2$, has a contact surface. The contact surface of the second step 45 has a constant radius with the respect to the bearing bolt 9, and this radius of the second step 45 is larger than the corresponding radius of the first step 43. This radius of the contact surface of the second step 45 is dimensioned so that while the control cam 19 abuts the contact surface of the second step 45, the control cam 19 is not acted on by the spring-loaded clamping eccentric 21 in a manner that would cause the control cam 19 to be held in abutment with the contact surface of the second step 45 by friction, due to urging by the spring-loaded clamping eccentric 21 (i.e., within the angle range $\phi_2$, no holding occurs in response to friction between the control cam 19 and the second step 45).

Following the second step 45 of the control element 41, and between the second step 45 of the control element 41 and the nearest other control element, is an angle range $\phi_3$. With the backrest 3/upper fitting part 8 exactly in a single predetermined position, the control cam 19 can be positioned between the ends of the two control elements that define the angle range $\phi_3$ so that the control cam 19 is in its position closest to the backrest's bearing bolt 9 and the detent pawl 15 is likewise in its position closest to the backrest's bearing bolt 9. This predetermined position is denoted as a table position, since in this position the backrest 3 is at least approximately horizontally aligned and thus can serve as a table.

Figure 3:
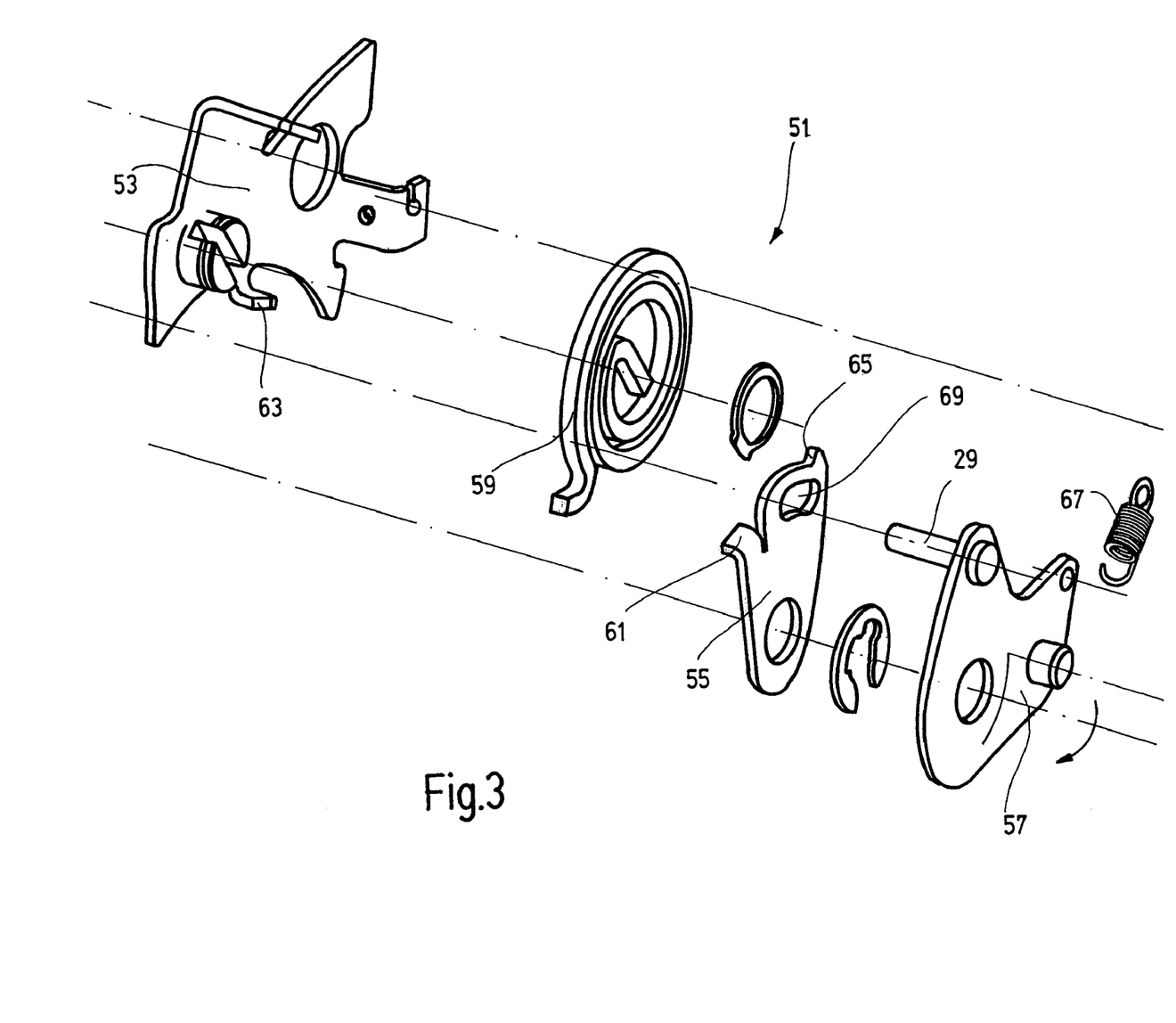
FIG. 3 is an exploded view of the control device of the fitting.

The fitting 5 includes a control device 51 at the exterior of the lower fitting part 7. The control device 51 controls the movement of the release bolt 29. The control device 51 includes a base 53, a clamping lever 55, and a control lever 57. The base 53 is fixedly connected to the lower fitting part 7. The clamping lever 55 is pivotably mounted on the eccentric bearing bolt 23. The control lever 57 is also pivotably mounted on the eccentric bearing bolt 23. One end of a spiral shaped clamping spring 59 is secured in a slot of the base 53, and the other end of the preloaded clamping spring 59 engages a bent portion 61 of the clamping lever 55. The preloaded clamping spring 59 works, through compression, in such a way that a stopper 65 of the clamping lever 55 rests on a stopper 63 on the base 53, i.e. the preloaded clamping spring 59 biases the clamping lever 55 toward pivoting in the counterclockwise direction in the drawings, namely FIGS. 4 and 5. The control lever 57 is preloaded in the same direction by a control lever spring 67, which can be a coil spring mounted between the base 53 and the control lever 57, i.e. the control lever spring 67 biases the control lever 57 toward pivoting in the counterclockwise direction in the drawings. The control lever spring 67 is constructed to be weaker than the clamping spring 59. The clamping lever 55 includes a slot 69 through which the release bolt 29, which is attached to the control lever 57, extends, so that the control lever 57 and the clamping lever 55 are coupled by a slot and pin guide.

The fitting 5 can be unlocked by rotating the control lever 57 in the clockwise direction in the drawings, i.e., rotating the control lever 57 against the force of the control lever spring 67. While the control lever 57 is initially rotated in the clockwise direction in the drawings, the release bolt 29 moves within the slot 69 and carries the intercepting component 25 and then the spring-loaded clamping eccentric 21 with it, and the clamping lever 55 remains at rest. When the release bolt 29 arrives at the end of the slot 69 (i.e., the right end of the slot 69 in the drawings), the detent pawl 15 and the gear rim 18 are no longer in contact, however, the control cam 19 is pivoted outwardly only up to the height of the first step 43 (i.e., the fitting 5 is in a first unlocked state). The backrest 3 can now be moved either from a custom position into another custom position, whereby the control cam 19 moves within the angle range $\phi_0$, or the backrest can rotate freely, i.e. can be brought from a custom position into the free rotating position, which is secured by the above-described engagement of the control cam 19 and first step 43 of the control element 41 in the angle range $\phi_1$.

Figure 5:
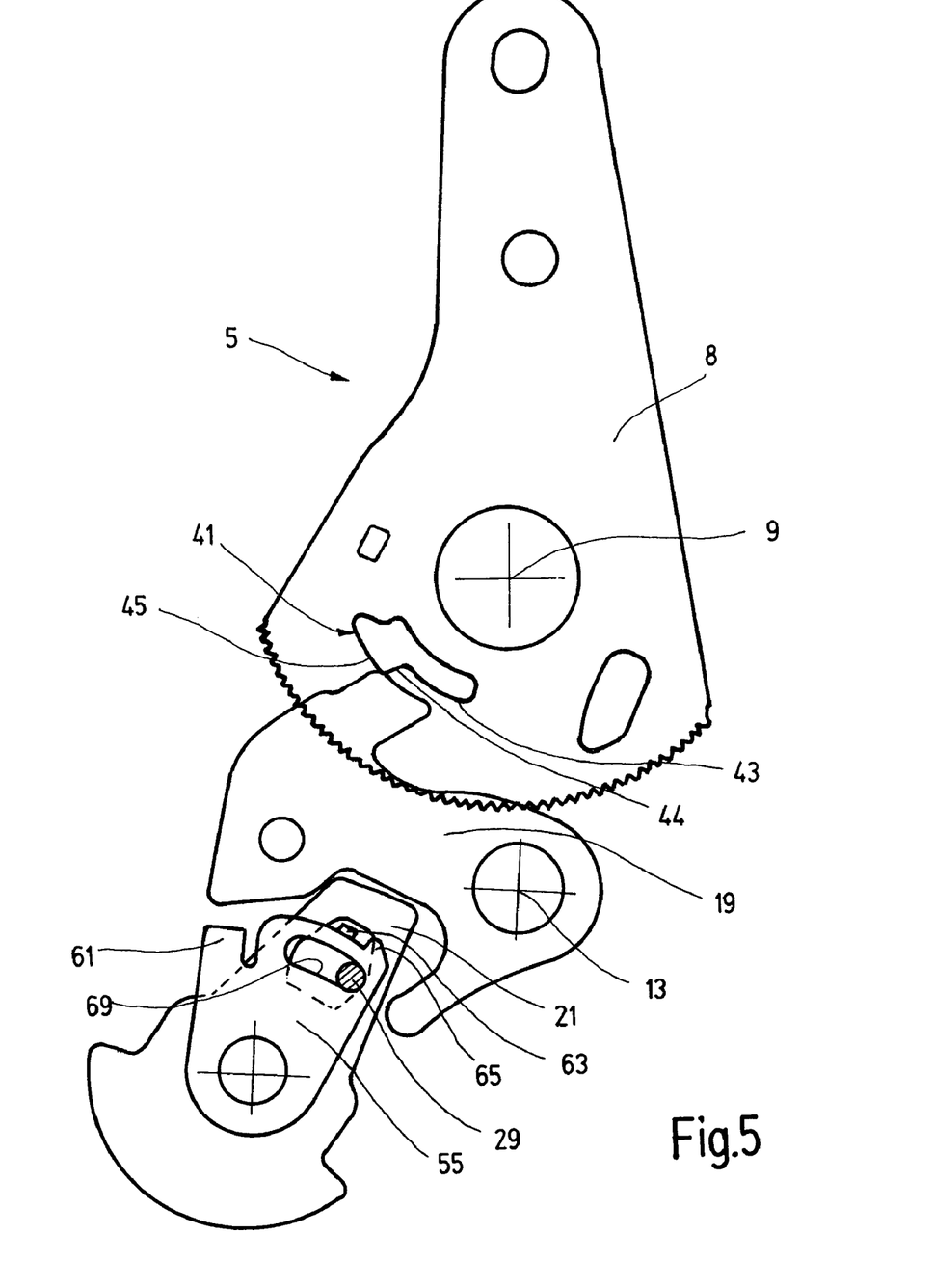
FIG. 5 is similar to FIG. 4 but with the fitting in the second unlocking stage.

For transitioning the fitting 5 from the first unlocked state to a second unlocked state, the control lever 57 is further rotated in the clockwise direction in the drawings, so that the locking bolt 29 carries the clamping lever 55. The clamping lever 55 rotates against the force of the clamping spring 59, so that rotation of the control lever 57 is simultaneously opposed by the clamping spring 59 and the control lever spring 67 operating in parallel, whereby a higher actuating force is required for reaching the second unlocked state than was required for reaching the first unlocked state. The fitting 5 is completely unlocked in the second unlocked state, i.e. the control cam 19 can move itself within the angle range $\phi_2$ freely over the second step 45 and arrive in the angle range $\phi_3$. Therefore, the backrest 3 can be brought into the table position and can lock in that position.

The return from the table position to the custom position takes place in reverse order, i.e. the actuating force for the second unlocking step is first applied and, starting from the freely rotating position, the actuating force of the first unlocking step is sufficient.

It will be understood by those skilled in the art that while the present invention has been discussed above with reference to an exemplary embodiment, various additions, modifications and changes can be made thereto without departing from the spirit and scope of the invention as set forth in the following claims.

What is claimed is:

1. A fitting for a vehicle seat, the fitting comprising:
a lower fitting part;
an upper fitting part mounted to a bearing bolt for pivoting relative to the lower fitting part;
a locking device movably connected to the lower fitting part for engaging with the upper fitting part and thereby locking the fitting;
a control cam connected to the locking device for engaging with at least one control element of the upper fitting part and thereby at least partially controlling the engaging between the locking device and the upper fitting part, wherein
    (a) the at least one control element includes at least two different steps that are for interacting with the control cam, and
    (b) the steps are respectively positioned at different radial distances from the bearing bolt; and
at least one spring-loaded clamping eccentric, wherein
in a first configuration of the fitting, the spring-loaded clamping eccentric at least indirectly acts on the locking device to at least partially secure the engaging of the locking device with the upper fitting part at least under normal conditions,
a first actuating force is required for moving the spring-loaded clamping eccentric so that the fitting can be transitioned from the first configuration to a second configuration, with the second configuration including
    (a) the locking device being disengaged from the upper fitting part, and
    (b) the control cam being engaged to the at least one control element,
a second actuating force is required for moving the spring-loaded clamping eccentric so that the fitting can be transitioned from the second configuration to a third configuration, with the third configuration including
    (a) the locking device being disengaged from the upper fitting part, and
    (b) the control cam being at least substantially disengaged from the at least one control element,
a control device includes a system of springs for defining the first actuating force and the second actuating force,
the system of springs includes at least two springs,
the control device further includes a base and at least two movable levers,
the movable levers includes
    (a) a control lever that is preloaded with respect to the base by at least one of the springs, and
    (b) a clamping lever that is preloaded with respect to the base by at least one of the springs, and
the fitting further comprising a coupling operatively associated with the clamping lever and the control lever so that
    (a) during transitioning from the first configuration to the third configuration, the clamping lever is carried along by the control lever after the control lever has moved relative to the clamping lever, and
    (b) during transitioning from the first configuration to the second configuration, the control lever is moved without the clamping lever being moved.

2. The fitting according to claim 1, wherein the two steps extend, with respect to the bearing bolt, in a circumferential direction respectively over angle ranges that are adjacent to each other.

3. The fitting according to claim 2, wherein the at least one control element further includes a shoulder that provides a transition between the two steps in the circumferential direction.

4. The fitting according to claim 2, wherein:
a first of the two steps is for interacting with the control cam during the second configuration, and
a second of the two steps is for interacting with the control cam during the third configuration.

5. The fitting according to claim 2, wherein a control device includes a system of springs for defining the first actuating force and the second actuating force, and wherein the system of springs includes at least two springs.

6. The fitting according to claim 1, wherein the at least one control element further includes a shoulder that provides a transition between the two steps in a circumferential direction, and wherein the circumferential direction is defined by the bearing bolt.

7. The fitting according to claim 6, wherein:
a first of the two steps is for interacting with the control cam during the second configuration, and
a second of the two steps is for interacting with the control cam during the third configuration.

8. The fitting according to claim 6, wherein a control device includes a system of springs for defining the first actuating force and the second actuating force, and wherein the system of springs includes at least two springs.

9. The fitting according to claim 1, wherein:
a first of the two steps is for interacting with the control cam during the second configuration, and
a second of the two steps is for interacting with the control cam during the third configuration.

10. The fitting according to claim 1, further comprising:
a locking element for supporting the locking device in the case of a crash, and
a coupling operatively associated with the locking element and the spring-loaded clamping eccentric so that, at least during transitioning from the first configuration to the second configuration, the spring-loaded clamping eccentric is carried along by the locking element after the locking element has moved relative to the spring-loaded clamping eccentric.

11. The fitting according to claim 1, wherein:
the fitting further comprises
    (a) a locking element for supporting the locking device in the case of a crash, and
    (b) a coupling operatively associated with the locking element and the spring-loaded clamping eccentric so that, at least during transitioning from the first configuration to the second configuration, the spring-loaded clamping eccentric is carried along by the locking element after the locking element has moved relative to the spring-loaded clamping eccentric;
a release bolt is mounted for moving during both the transitioning from the first configuration to the second configuration and the transitioning from the second configuration to the third configuration; and
the release bolt is part of each of
    said coupling operatively associated with the clamping lever and the control lever, and
    said coupling operatively associated with the locking element and the spring-loaded clamping eccentric.

12. The fitting according to claim 1 in combination with the vehicle seat, wherein the vehicle seat includes a backrest mounted to the fitting.

13. A fitting for a vehicle seat, the fitting comprising:
a lower fitting part;
an upper fitting part mounted to a bearing bolt for pivoting relative to the lower fitting part;
a locking device movably connected to the lower fitting part for engaging with the upper fitting part and thereby locking the fitting;
a control cam connected to the locking device for engaging with at least one control element of the upper fitting part and thereby at least partially controlling the engaging between the locking device and the upper fitting part, wherein
  (a) the at least one control element includes at least two different steps that are for interacting with the control cam,
  (b) the steps are respectively positioned at different radial distances from the bearing bolt, and
  (c) the two steps extend, with respect to the bearing bolt, in a circumferential direction respectively over angle ranges that are adjacent to each other; and
at least one spring-loaded clamping eccentric, wherein
in a first configuration of the fitting, the spring-loaded clamping eccentric at least indirectly acts on the locking device to at least partially secure the engaging of the locking device with the upper fitting part at least under normal conditions,
a first actuating force is required for moving the spring-loaded clamping eccentric so that the fitting can be transitioned from the first configuration to a second configuration, with the second configuration including
  (a) the locking device being disengaged from the upper fitting part, and
  (b) the control cam being engaged to the at least one control element,
a second actuating force is required for moving the spring-loaded clamping eccentric so that the fitting can be transitioned from the second configuration to a third configuration, with the third configuration including
  (a) the locking device being disengaged from the upper fitting part, and
  (b) the control cam being at least substantially disengaged from the at least one control element,
a control device includes a system of springs for defining the first actuating force and the second actuating force,
the system of springs includes at least two springs,
the control device further includes a base and at least two movable levers,
the movable levers includes
  (a) a control lever that is preloaded with respect to the base by at least one of the springs, and
  (b) a clamping lever that is preloaded with respect to the base by at least one of the springs, and
the fitting further comprises a coupling operatively associated with the clamping lever and the control lever so that
  (a) during transitioning from the first configuration to the third configuration, the clamping lever is carried along by the control lever after the control lever has moved relative to the clamping lever, and
  (b) during transitioning from the first configuration to the second configuration, the control lever is moved without the clamping lever being moved.

14. The fitting according to claim 13, wherein the at least one control element further includes a shoulder that provides a transition between the two steps in a circumferential direction, and wherein the circumferential direction is defined by the bearing bolt.

15. The fitting according to claim 13, wherein:
a first of the two steps is for interacting with the control cam during the second configuration, and
a second of the two steps is for interacting with the control cam during the third configuration.

16. A fitting for a vehicle seat, the fitting comprising:
a lower fitting part;
an upper fitting part mounted to a bearing bolt for pivoting relative to the lower fitting part;
a locking device movably connected to the lower fitting part for engaging with the upper fitting part and thereby locking the fitting;
a control cam connected to the locking device for engaging with at least one control element of the upper fitting part and thereby at least partially controlling the engaging between the locking device and the upper fitting part, wherein
  (a) the at least one control element includes at least two different steps that are for interacting with the control cam,
  (b) the steps are respectively positioned at different radial distances from the bearing bolt,
  (c) the at least one control element further includes a shoulder that provides a transition between the two steps in a circumferential direction, and
  (d) the circumferential direction is defined by the bearing bolt; and
at least one spring-loaded clamping eccentric, wherein
in a first configuration of the fitting, the spring-loaded clamping eccentric at least indirectly acts on the locking device to at least partially secure the engaging of the locking device with the upper fitting part at least under normal conditions,
a first actuating force is required for moving the spring-loaded clamping eccentric so that the fitting can be transitioned from the first configuration to a second configuration, with the second configuration including
  (a) the locking device being disengaged from the upper fitting part, and
  (b) the control cam being engaged to the at least one control element,
a second actuating force is required for moving the spring-loaded clamping eccentric so that the fitting can be transitioned from the second configuration to a third configuration, with the third configuration including
  (a) the locking device being disengaged from the upper fitting part, and
  (b) the control cam being at least substantially disengaged from the at least one control element,
a control device includes a system of springs for defining the first actuating force and the second actuating force,
the system of springs includes at least two springs,
the control device further includes a base and at least two movable levers,
the movable levers includes
  (a) a control lever that is preloaded with respect to the base by at least one of the springs, and
  (b) a clamping lever that is preloaded with respect to the base by at least one of the springs, and
the fitting further comprises a coupling operatively associated with the clamping lever and the control lever so that
  (a) during transitioning from the first configuration to the third configuration, the clamping lever is carried along by the control lever after the control lever has moved relative to the clamping lever, and (b) during transitioning from the first configuration to the second configuration, the control lever is moved without the clamping lever being moved.

17. The fitting according to claim 16, wherein the two steps extend, with respect to the bearing bolt, in a circumferential direction respectively over angle ranges that are adjacent to each other.

18. The fitting according to claim 16, wherein:

a first of the two steps is for interacting with the control cam during the second configuration, and a second of the two steps is for interacting with the control cam during the third configuration.

19. A fitting for a vehicle seat, the fitting comprising:

a lower fitting part;

an upper fitting part mounted to a bearing bolt for pivoting relative to the lower fitting part;

a locking device movably connected to the lower fitting part for engaging with the upper fitting part and thereby locking the fitting;

a control cam connected to the locking device for engaging with at least one control element of the upper fitting part and thereby at least partially controlling the engaging between the locking device and the upper fitting part; and at least one spring-loaded clamping eccentric, wherein in a first configuration of the fitting, the spring-loaded clamping eccentric at least indirectly acts on the locking device to at least partially secure the engaging of the locking device with the upper fitting part at least under normal conditions, a first actuating force is required for moving the spring-loaded clamping eccentric so that the fitting can be transitioned from the first configuration to a second configuration, with the second configuration including (a) the locking device being disengaged from the upper fitting part, and (b) the control cam being engaged to the at least one control element, a second actuating force is required for moving the spring-loaded clamping eccentric so that the fitting can be transitioned from the second configuration to a third configuration, with the third configuration including (a) the locking device being disengaged from the upper fitting part, and (b) the control cam being at least substantially disengaged from the at least one control element, the at least one control element includes at least two steps and a shoulder that provides a transition between the two steps, a first of the two steps is for interacting with the control cam during the second state, a second of the two steps is for interacting with the control cam during the third state, the steps are respectively positioned at different radial distances from the bearing bolt, and the two steps extend, with respect to the bearing bolt, in a circumferential direction respectively over angle ranges that are adjacent to each other.

20. The fitting according to claim 19, wherein:

a control device includes a system of springs for defining the first actuating force and the second actuating force, and wherein the system of springs includes at least two springs;

the control device further includes a base and at least two movable levers;

the movable levers includes (a) a control lever that is preloaded with respect to the base by at least one of the springs, and (b) a clamping lever that is preloaded with respect to the base by at least one of the springs;

the fitting further comprises a coupling operatively associated with the clamping lever and the control lever so that (a) during transitioning from the first configuration to the third configuration, the clamping lever is carried along by the control lever after the control lever has moved relative to the clamping lever, and (b) during transitioning from the first configuration to the second configuration, the control lever is moved without the clamping lever being moved;

the fitting further comprises (a) a locking element for supporting the locking device in the case of a crash, and (b) a coupling operatively associated with the locking element and the spring-loaded clamping eccentric so that, at least during transitioning from the first configuration to the second configuration, the spring-loaded clamping eccentric is carried along by the locking element after the locking element has moved relative to the spring-loaded clamping eccentric;

a release bolt is mounted for moving during both the transitioning from the first configuration to the second configuration and the transitioning from the second configuration to the third configuration; and the release bolt is part of each of (a) said coupling operatively associated with the clamping lever and the control lever, and (b) said coupling operatively associated with the locking element and the spring-loaded clamping eccentric.

* * * * *